United States Patent [19]

Christenson

[11] 4,305,800

[45] Dec. 15, 1981

[54] METHOD OF DIRECTING WATER BY ELECTRO-OSMOSIS TO AN ELECTRICALLY CONDUCTIVE PILE

[76] Inventor: Lowell B. Christenson, 7410 Thurow, Houston, Tex. 77087

[21] Appl. No.: 224,726

[22] Filed: Jan. 13, 1981

Related U.S. Application Data

[63] Continuation-in-part of Ser. No. 132,242, Mar. 20, 1980.

[51] Int. Cl.$^3$ .................... B01D 13/02; E02D 7/26
[52] U.S. Cl. ........................ 204/180 R; 204/299 R; 166/248; 175/19; 405/228; 405/232
[58] Field of Search ................ 204/180 R, 299 R; 405/228, 232; 166/248; 175/19

[56] References Cited

U.S. PATENT DOCUMENTS

| | | | |
|---|---|---|---|
| 4,046,657 | 9/1977 | Abbott | 204/180 R |
| 4,119,511 | 10/1978 | Christenson | 204/180 R |
| 4,124,483 | 11/1978 | Christenson | 204/299 R |
| 4,157,287 | 6/1979 | Christenson | 204/180 R |

OTHER PUBLICATIONS

Pile Driving by Electro-Osmosis, Nikolaev, Consultants Bureau, 1962.

*Primary Examiner*—Arthur C. Prescott
*Attorney, Agent, or Firm*—Fulbright & Jaworski

[57] ABSTRACT

A method of directing water by electro-osmosis to an electrically conductive pile for driving or pulling the pile into or from soil having water above the soil. When the pile is in contact with the soil directing a direct current downwardly to a plurality of locations surrounding the pile and to the pile for increasing the water content of the soil adjacent the pile while preventing the flow of electricity to the pile through the water. The method comprehends placing an anode having a plurality of surfaces into the soil, placing the pile within the plurality of surfaces of the anode and into the soil, insulating the surfaces of the anode from the pile above the soil for preventing electricity flowing between the anode surfaces and the pile through the water but allowing electricity to flow between anode surfaces and the pile through the soil, and directing d-c current from the anode surfaces through the soil for increasing the water content of the soil adjacent the pile. The method further comprehends insulating the anode from the pile by bonding an insulator to the anode surfaces or insulating between the anode surfaces and the pile. The anode may include a plurality of legs having insulation on the exterior of the legs, or be hollow with insulation on the inside of the anode or the pile may include an upward electrically non-conductive portion and a lower electrically conductive portion in which the upper portion extends above the water and into the soil. The method further comprehends increasing the load bearing strength of a driven pile by reversing the current flow after the pile is driven.

15 Claims, 5 Drawing Figures

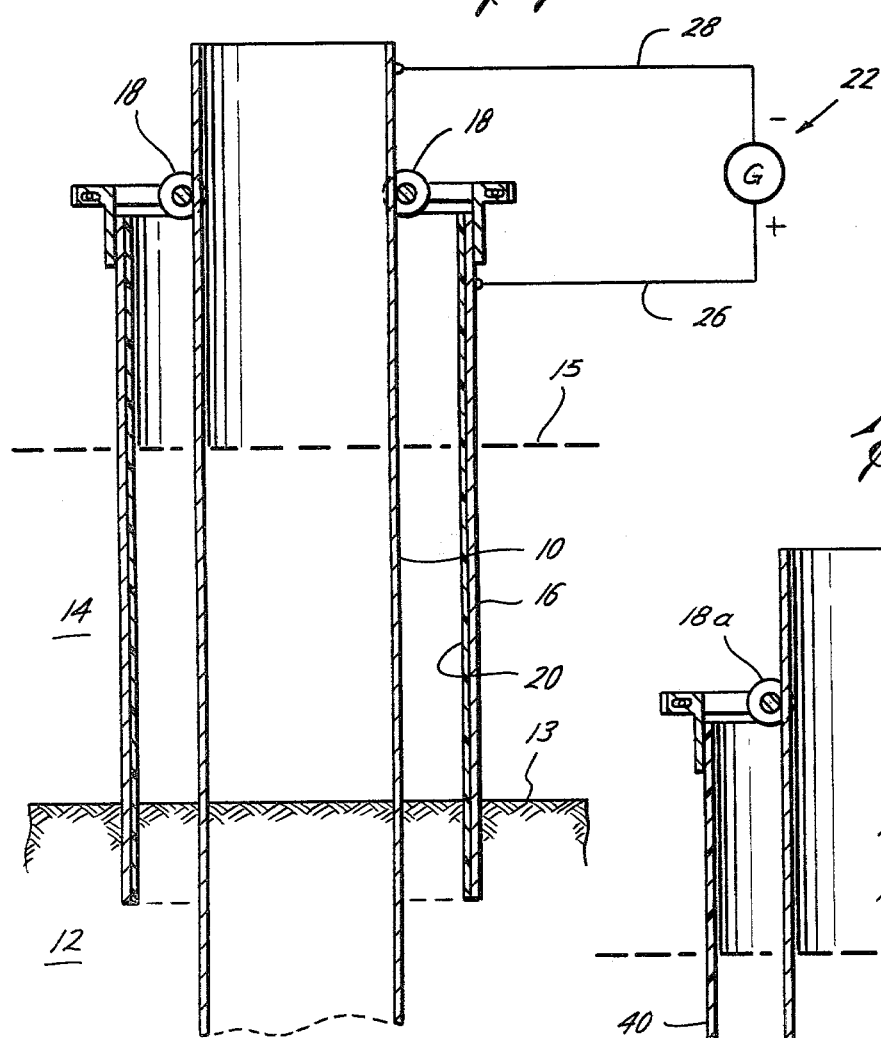
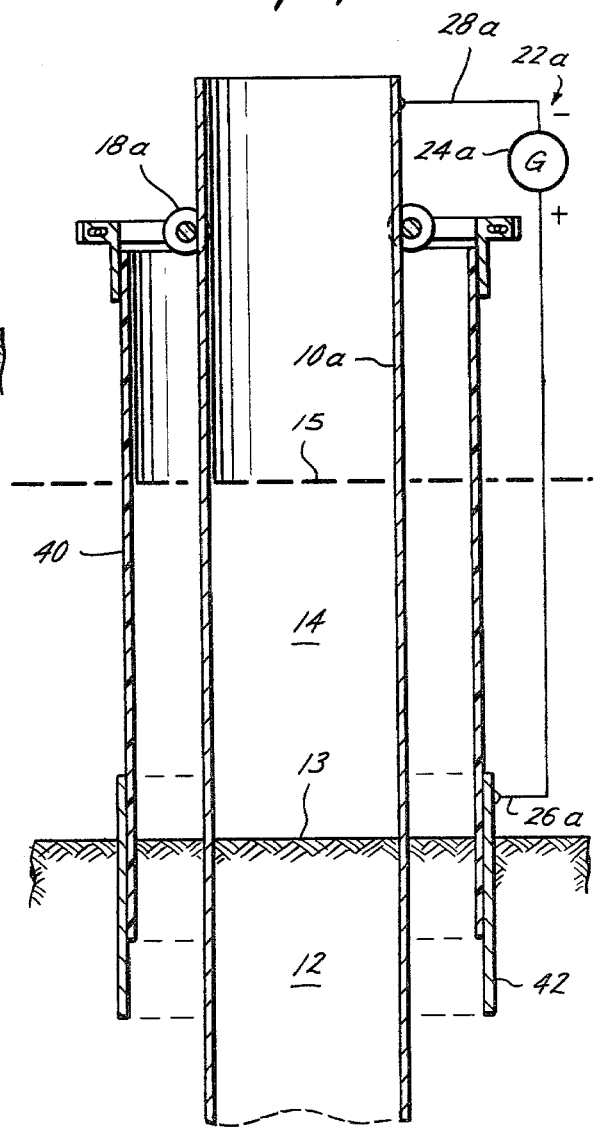
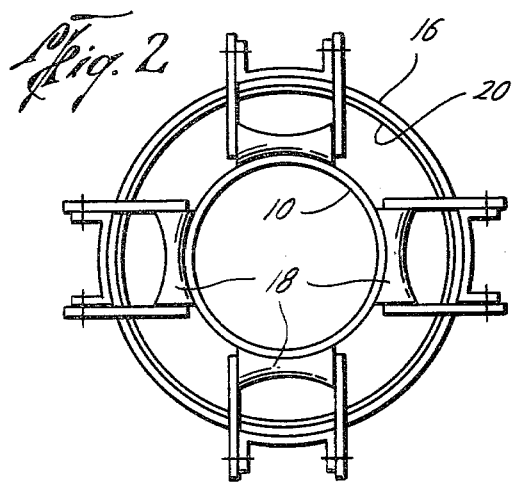

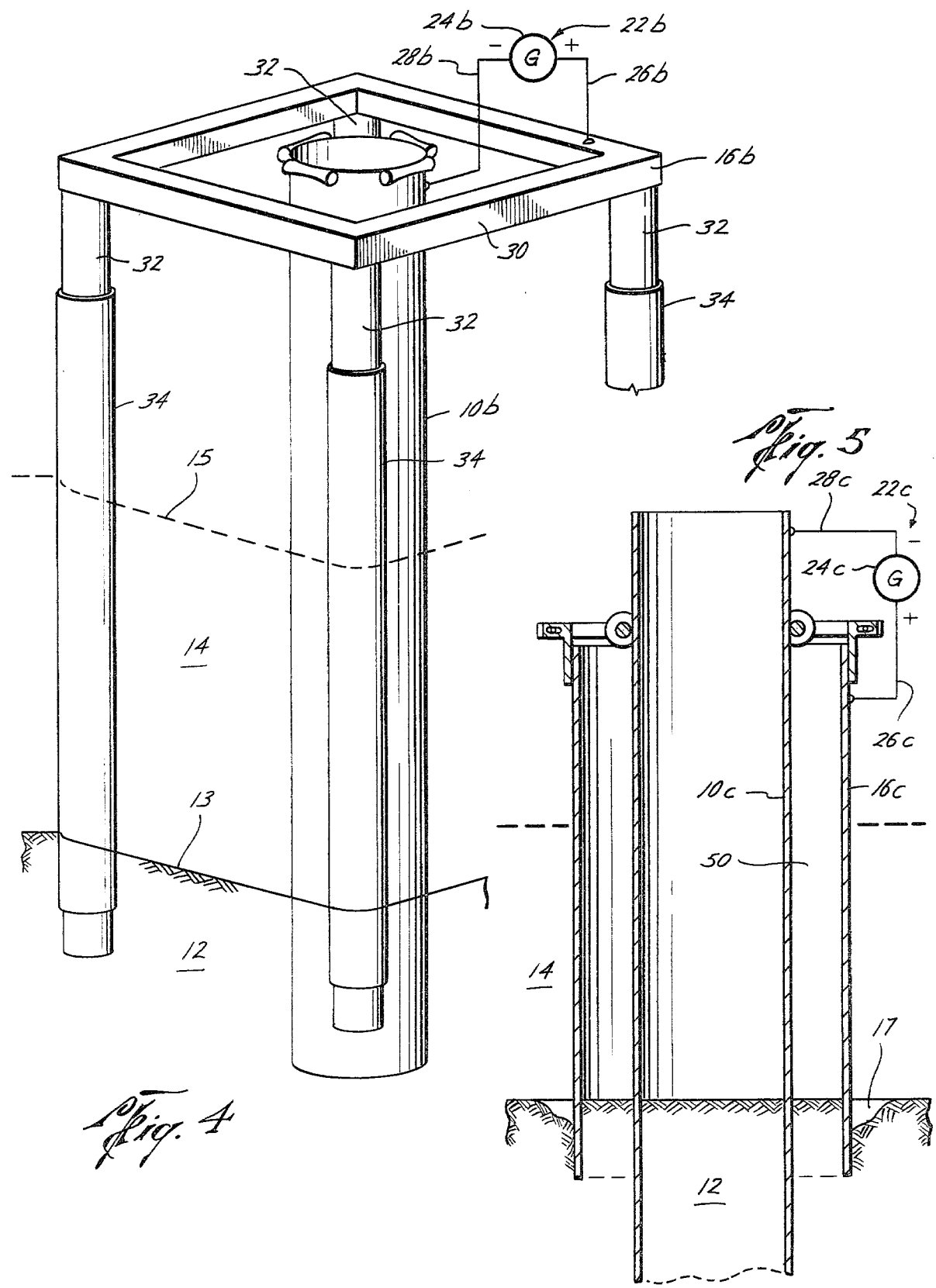

METHOD OF DIRECTING WATER BY ELECTRO-OSMOSIS TO AN ELECTRICALLY CONDUCTIVE PILE

REFERENCES TO RELATED APPLICATIONS

This application is a continuation in part of copending patent application Ser. No. 132,242, filed Mar. 20, 1980, entitled Apparatus and Method for Increasing the Load Bearing Strength of a Pile.

BACKGROUND OF THE INVENTION

It is generally known to utilize the principle of electro-osmosis to both assist pile driving and increase the load bearing strength of soil as described in "Pile Driving by Electro-Osmosis", Nikolaev, Consulants Bureau, 1962; and U.S. Pat. No. 4,046,657; 4,119,511; 4,124,483 and 4,157,287.

However, the prior art of driving and/or increasing the load bearing strength of an electrically conductive pile requires that the pile have an insulation coated to the pile. Bonding an insulator to the pile is expensive, and time-consuming, and of course must be utilized on each section of pile that is driven. The present invention is directed to an improved method of directing water to an electrically conductive pile for purposes of assisting in driving the pile or pulling the pile in which insulation is not required to be bonded to the pile. The present method also provides a new improved method in increasing the amount of water directed to the pile by directing electrical current to the pile through the soil from a plurality of locations about the pile.

SUMMARY

The present invention is directed to the method of directing water by electro-osmosis to an electrically conductive pile for assisting the driving or pulling of the pile into or from soil having water above the soil whereby when the pile is in contact with the soil and an electrical direct current is directed downwardly through the soil to a plurality of locations about the pile and to the pile for increasing the water content of the soil adjacent the pile while preventing the flow of electricity to the pile through the water.

Yet a still further method is the provision of directing water by electro-osmosis to an electrically conductive pile by placing an anode having a plurality of surfaces into the soil and placing the pile within the plurality of surfaces of the anode and into the soil, insulating the surfaces of the anode from the pile above the soil for preventing electricity flowing between the anode surfaces and the pile through the water but allowing electricity to flow between the anode surfaces and the pile through the soil, and directing direct current from the anode surfaces to the pile through the soil for increasing the water content of the soil adjacent the pile.

Yet a further object of the present invention is the method of insulating the anode from the pile by bonding an insulator to the anode surfaces. In one embodiment where the anode is a hollow body the anode is bonded with an insulator to the inside of the anode or by insulating the anode from the pile by an insulating fluid. In another embodiment where the anode surfaces include a plurality of legs the insulation is performed by bonding an insulator to the exterior of the legs. In a further embodiment the anode is provided with an upper electrically non-conductive portion and a lower electrically conductive portion with the lower portion being driven into the soil and the upper portion extends above the water and extends into the soil.

A still further object of the present invention is the provision of a method of increasing the load bearing strength of a pile by, after the pile is driven, of reversing the current flow for reducing the water content of the soil adjacent the pile.

Yet a further object of the present invention is the method of directing water to an electrically conductive pile by placing a hollow circular electrically conductive anode in the soil and placing the pile coaxially through the anode and into the soil, insulating the anode from the pile by insulation extending from above the water to slightly below the top of the soil whereby electricity will not flow between the anode and the pile through the water, connecting the cathode of an electrical circuit having a d-c power source, and said anode, to the electrically conductive pile, and directing direct current from the anode to the cathode through the soil for increasing the water content of the soil adjacent the pile.

Other and further objects, features and advantages will be apparent from the following description of presently preferred embodiments of the invention, given for the purpose of disclosure and taken in conjunction with the accompanying drawing.

BRIEF DESCRIPTION OF THE DRAWING

FIG. 1 is an elevational and schematic view, in cross section, of one form of the present invention, FIG. 2 is a cross-sectional view taken along the line 2—2 of FIG. 1, FIG. 3 is an elevational view, in cross section, of another embodiment of the present inention, FIG. 4 is a perspective and schematic view of another form of the present invention, and FIG. 5 is an elevational and schematic view, in cross section, of a further embodiment of the present invention.

DESCRIPTION OF THE PREFERRED EMBODIMENTS

For the purpose of illustration, the present invention will be described in connection with a pile 10 which is driven into or pulled from the soil 12 containing water 14, such as the ocean. The pile 10 may be driven or pulled by any suitable conventional mechanism which does not form part of the present invention.

While the present invention is directed to moving water by electro-osmosis to a pile having an electrically conductive portion, which may be either hollow or solid and may have various shapes, the invention will be described, for purposes of illustration only, of directing water by electro-osmosis to a circular, hollow, electrically conductive pile, typically a hollow steel pipe.

The presently preferred embodiment of the invention, as shown in FIGS. 1 and 2, includes placing a hollow circular electrically conductive anode 16, such as steel pipe, through the water 14 and into the soil 12 and placing the pile 10 through the anode 16 and into the soil 12. If desired, a plurality of rollers 18 are provided which may be supported from the anode 16 for guiding te pile 10 coaxially through the anode 16. Additional sets of rollers are not needed as piles 10 are accurately plumbed and set in place and driven. An electrical conducting path from the pile 10 to the anode 16 through the rollers 18 is prevented by any suitable means such as making the rollers 18 out of a suitable non-conducting material such as rubber. It is to be noted that the bottom 17 of the anode 16 is positioned about and preferably surrounds the pile 10 for providing an extended surface or surfaces for creating a maximum area of electrical paths about the periphery of the pile 10 for moving a maximum amount of water from the anode 16 to the pile 10.

Insulation is provided between the anode 16 and the pile 10 for preventing electricity flowing between the anode 16 and the pile 10 through the water 14 but allowing electricity to flow between the anodes 16 and the pile 10 through the soil 12. Preferably, an electrical insulator 20 is bonded on the inside of the anode 16 and may be of any suitable electrical non-conductor such as polyurethane or epoxy. In particular, a polyurethane insulating coating sold under the trade name Zebron or an epoxy such as Colebrand of 10 to 20 mls. thickness is satisfactory. The length of the coating 20 on the pile 16 is sufficient to prevent an electrical path between the anode 16 and the pile 10 through the water 14 and thus must extend above the top 15 of the water and be slightly embedded below the top 13 of the soil 12.

In order to direct water from the water 14 on and in the soil 12 to the pile 10 as it is driven or pulled an electrical circuit generally indicated by the reference numeral 22, is provided. The circuit 22 includes a conventional d-c power source 24 in which the positive lead 26 is connected to the anode 16 and the negative lead 28 is connected to the pile 10 which acts as a cathode. The electrical circuit 24 provides an electrical current moving from the source 24 through the anode 16 and through the soil 12 for moving water towards the pile 10. The accumulation of water adjacent the pile 10 will loosen the adhesion of the soil to the pile and decrease the shear strength of the soil adjacent the pile 12 thereby making the pile easier to drive to the soil 12 or making the pile 10 eaiser to pull from the soil 12.

It is particularly to be noted that the present invention allows the anode 16 to be set on location for driving or pulling a pile 10 without requiring that the pile 10 be coated with an insulator, and allows the anode 16 to be retrieved and used for driving or pulling additional piles 10.

Furthermore, the circumferential extent of the lower portion 17 of the anode 16 about the pile 10 allows a maximum amount of water to be transmitted to the pile 10 and insures increased wetting of the pile 10 around its entire periphery.

After driving a pile, the present method includes, reversing the current flow in the electrical circuit 22 for reducing the water content of the soil 12 adjacent the pile 10 thereby increasing the load bearing strength of the soil 12 by reducing the water content of the soil adjacent the pile 10.

In operation, the method of the present invention directs water to the electrically conductive pile 10 for assisting the driving or pulling of the pile into or from soil 12 having water 14 above the soil and includes, when the pile 10 is in contact with the soil 12, of directing a direct current downwardly through the soil to a plurality of locations 17 about the pile 10 and to the pile 10 for increasing the water content of the soil 12 adjacent the pile 10 while preventing the flow of electricity to the pile 10 through the water 14.

Referring now to FIG. 3, another embodiment of the present invention is best seen in which an anode 16a is provided and through which a pile 10a coaxially extends. The anode 16a includes an upper electrical non-conductive portion 40 and a lower electrical conductive portion 42 which is connected to an electrical lead 44. An electrical circuit 22a is provided having a d-c power source 24a with the electrical line 44 connected to the positive terminal 26a, and a negative lead 28a is connected to the pile 10a which acts as a cathode. Again, the anode portion 40 insulates any electrical flow between the anode 16a and the pile 10a through the water 14, but allows electrical flow from the lower anode portion 42 and the pile 10b through the soil 12. The insulated anode portion 40 extends above the water surface 15 and below the soil surface 13. Again, this embodiment provides a method of driving or pulling an electrically conductive pile without requiring that the pile be coated and insulated, and provides an electrical path surrounding the pile 10a for increasing the flow of water to the entire outer periphery of the pile 10a.

Referring now to FIG. 4, another embodiment of the present invention is best seen in which an electrically conductive pile 10b is in position to be driven into the soil 12 beneath the water 14. An electrical circuit 22b is provided having a d-c power source 24a having a positive lead 26b connected to an anode 16b and an electrical negative lead 29b connected to the electrically conductive pile 10a which acts as a cathode.

The anode 16b includes a frame 30 with a plurality of depending electrically conductive legs 32 forming a plurality of anode surfaces which are inserted into the soil 12. Thus it is noted that when the pile 10b is placed in position and the legs 32 are positioned about and surround the pile 10a. Insulation 34 is positioned about the legs extending above the surface 15 of the water to slightly below the surface 13 of the soil 12 thereby insulating the surfaces of the legs 32 from the pile 10b for preventing electricity flowing between the legs 32 and the pile 10b through the water 14, but allowing electricity to flow between the anode surfaces and the pile 10b through the soil 12.

Similar to the embodiment of FIGS. 1 and 2, rubber rollers 18a may be provided for guiding the pile 10b through the center of the anode 16b.

Referring now to FIG. 5, still another embodiment of the present invention is best seen in which an uninsulated electrically conductive pile 10c is placed coaxially through a hollow anode 16c and into the soil 12. An electrical circuit 22c is provided having a dc power source 24c and a positive lead 26c connected to the anode and a negative lead 28c connected to the pile 10c which forms a cathode. In this embodiment, the anode 16c is of metal such as a steel tubular member. The anode 16c is insulated from the pile 10c by providing an insulating medium 50 in the annulus between the anode 16c and the pile 10c. If the pile 10c is being driven through a natural body of water 14 then the annulus 50 would be pumped dry after the anode 16c is placed in position, thereby leaving a non-conductive medium such as air in the annulus 50 therebetween or by filiing the annulus 50 with a suitable insulating liquid such as silicone oil. Of course, in such a use it is necessary to thoroughly evacuate the water from the annulus 50 in order to prevent shorting out of the electrical circuit between the anode 16c and the pile 10c.

However, the embodiment of FIG. 5 is particularly useful when driving or pulling a pile 10c from a soil 12 which does not contain natural water thereon but in which the water 14 is placed on the exterior of the anode 16c after the anode 16c is positioned in the soil 12. In this event the annulus 50 will be naturally filled with air, a suitable insulator, or other desired insulating medium. Preferably, it may be desirable after placing the anode 16c in position that a small trench 17 be dug around the exterior of the metallic anode 16c in order to insure that there is adequate water which can be used to migrate from the anode 16c to the pile 10c in the event that a suitable depth of the water 14 cannot be achieved.

In addition to the embodiment shown, the present method may be used for directing water to piles driven through the legs of a structure such as an offshore drilling structure in which the legs may act as the anode and the piles as a cathode with a suitable insulator provided between the anode and the cathode.

In all of the embodiments the electrically conductive pile is not required to be coated and in all of the embodiments the method of directing water by electro-osmosis to an electrically conductive pile can be used to assist the driving or pulling of the pile into or from soil having water above the soil. That is, when the pile is in contact with the soil the method comprehends directing a direct current downwardly through the soil to a plurality of locations about the pile and to the pile for increasing and maximizing the water content of the soil adjacent the pile while preventing the flow of electricity to the pile through the water. In addition, all of the embodiments disclose directing electricity from various anode surfaces positioned about the outer periphery of the pile whereby the entire periphery of the pile may be wet by the water migration. And in the event that the pile is being driven and it is desired to increase the load bearing strength of the pile, all of the embodiments contemplate reversing the current flow for reducing the water content of the soil adjacent the pile.

The present invention, therefore, is well adapted to carry out the objects and attain the ends and advantages mentioned as well as others inherent therein. While presently preferred embodiments of the invention have been given for the purpose of disclosure, numerous changes in any steps of the process will readily suggest themselves to those skilled in the art and which are encompassed within the spirit of the invention and the scope of the appended claims.

What is claimed is:

1. The method of directing water to an electrically conductive pile for assisting the driving or pulling of the pile into or from soil having water above the soil comprising,
   when the pile is in contact with the soil directing a direct current downwardly through the soil to a plurality of locations about the pile and to the pile for increasing the water content of the soil adjacent the pile while preventing the flow of electricity to the pile through the water.

2. The method of claim 1 including increasing the load bearing strength of a pile by, after the pile is driven, reversing the current flow for reducing the water content of the soil adjacent the pile.

3. The method of directing water to an electrically conductive pile for assisting the driving or pulling of the pile into or from soil having water above the soil comprising,
   placing an anode having a plurality of surfaces into the soil,
   placing the pile within the plurality of surfaces of the anode and into the soil,
   insulating the surfaces of the anode from the pile above the soil for preventing electricity flowing between the anode surfaces and the pile through the water but allowing electricity to flow between anode surfaces and the pile through the soil, and
   directing d-c current from the anode surfaces to the pile through the soil for increasing the water content of the soil adjacent the pile.

4. The method of claim 3 including insulating the anode from the pile by bonding an insulator to the anode surfaces.

5. The method of claim 3 wherein the anode surfaces include a plurality of legs and including insulating the legs by bonding an insulator to the exterior of the legs.

6. The method of claim 6 including guiding the pile between the anode surfaces.

7. The method of directing water to an electrically conductive pile for assisting the driving or pulling of the pile into or from soil having water above the soil comprising,
   placing a hollow anode in the soil,
   placing the pile through the anode and into the soil,
   insulating the anode from the pile above the soil,
   connecting the cathode of an electrical circuit having a d-c power source, and said anode, to the pile,
   directing d-c current from the anode to the cathode through the soil for increasing the water content of the soil adjacent the pile.

8. The method of claim 7 including increasing the load bearing strength of a pile by, after the pile is driven, reversing the current flow for reducing the water content of the soil adjacent the pile.

9. The method of claim 7 including insulating the anode from the pile by bonding an insulator to the inside of the anode.

10. The method of claim 7 including insulating the anode from the pile by an insulating fluid.

11. The method of claim 7 wherein the anode includes an upper electrically non-conductive portion and a lower electrically conductive portion, and the lower portion is driven into the soil and the upper portion extends above the water and extends into the soil.

12. The method of claim 7 wherein the anode includes an insulator extending through the water and a conductor positioned in the soil.

13. The method of directing water to an electrically conductive pile for assisting the driving or pulling of the pile into or from soil having water above the soil comprising,
    placing a hollow circular electrically conductive anode in the soil,
    placing the pile through the anode and into the soil,
    insulating the anode from the pile above the soil whereby electricity will not flow between the anode and the pile through the water,
    connecting the cathode of an electrical circuit having a d-c power source, and said anode, to the pile,
    directing d-c current from the anode to the cathode through the soil for increasing the water content of the soil adjacent the pile.

14. The method of claim 13 including, insulating the anode from the pile by bonding an insulator to the inside of the anode.

15. The method of directing water to an electrically conductive pile for assisting the driving or pulling of the pile into or from soil having water above the soil comprising,
    placing an anode having a plurality of surfaces into the soil,
    placing the pile within the plurality of surfaces of the anode and into the soil, insulating the surfaces of the anode from the pile above the water to slightly below the soil for preventing electricity flowing between the anode surfaces and the pile through the water but allowing electricity to flow between the anode surfaces and the pile through the soil, and directing d-c current from the anode surfaces to the pile through the soil for increasing the water content of the soil adjacent the pile.

* * * * *